(12) United States Patent
Ruiz et al.

(10) Patent No.: US 8,172,919 B1
(45) Date of Patent: May 8, 2012

(54) WINDOW FILTER APPARATUS

(76) Inventors: Ricardo F. Ruiz, Los Angeles, CA (US);
Ricardo F. Ruiz, Jr., Los Angeles, CA (US)

( * ) Notice: Subject to any disclaimer, the term of this patent is extended or adjusted under 35 U.S.C. 154(b) by 331 days.

(21) Appl. No.: 12/506,959

(22) Filed: Jul. 21, 2009

(51) Int. Cl.
*B01D 39/00* (2006.01)

(52) U.S. Cl. ............... 55/495; 55/315; 55/471; 55/500; 55/DIG. 5; 55/DIG. 31

(58) Field of Classification Search ............ 55/315, 55/471–475, 490, 495–497, 499, 500–502, 55/504–506, 509, 511, 528, DIG. 5, DIG. 31; 96/134
See application file for complete search history.

(56) References Cited

U.S. PATENT DOCUMENTS

| | | | | |
|---|---|---|---|---|
| 2,768,852 A | * | 10/1956 | Hicks | 292/175 |
| 2,992,701 A | | 11/1959 | White | |
| 3,698,308 A | * | 10/1972 | Navara | 454/213 |
| 4,781,526 A | | 11/1988 | Mead | |
| 5,492,551 A | * | 2/1996 | Wolfe | 55/496 |
| D449,098 S | | 10/2001 | Reede | |
| 6,527,838 B2 | | 3/2003 | Volo et al. | |
| 7,320,637 B2 | * | 1/2008 | Lack | 454/96 |

* cited by examiner

*Primary Examiner* — Jason M Greene
*Assistant Examiner* — Karla Hawkins

(57) ABSTRACT

The window filter apparatus provides a framework for holding filters within the frame of windows, thereby offering filtered outside air for a building, without having to run an air conditioner. The apparatus further provides for filtering noise and light by the same filters. Box fans are ideal companions for the apparatus for drawing additional outside air into a building. No additional hardware or tools are needed. There is no invasion of windows or window frames.

4 Claims, 6 Drawing Sheets

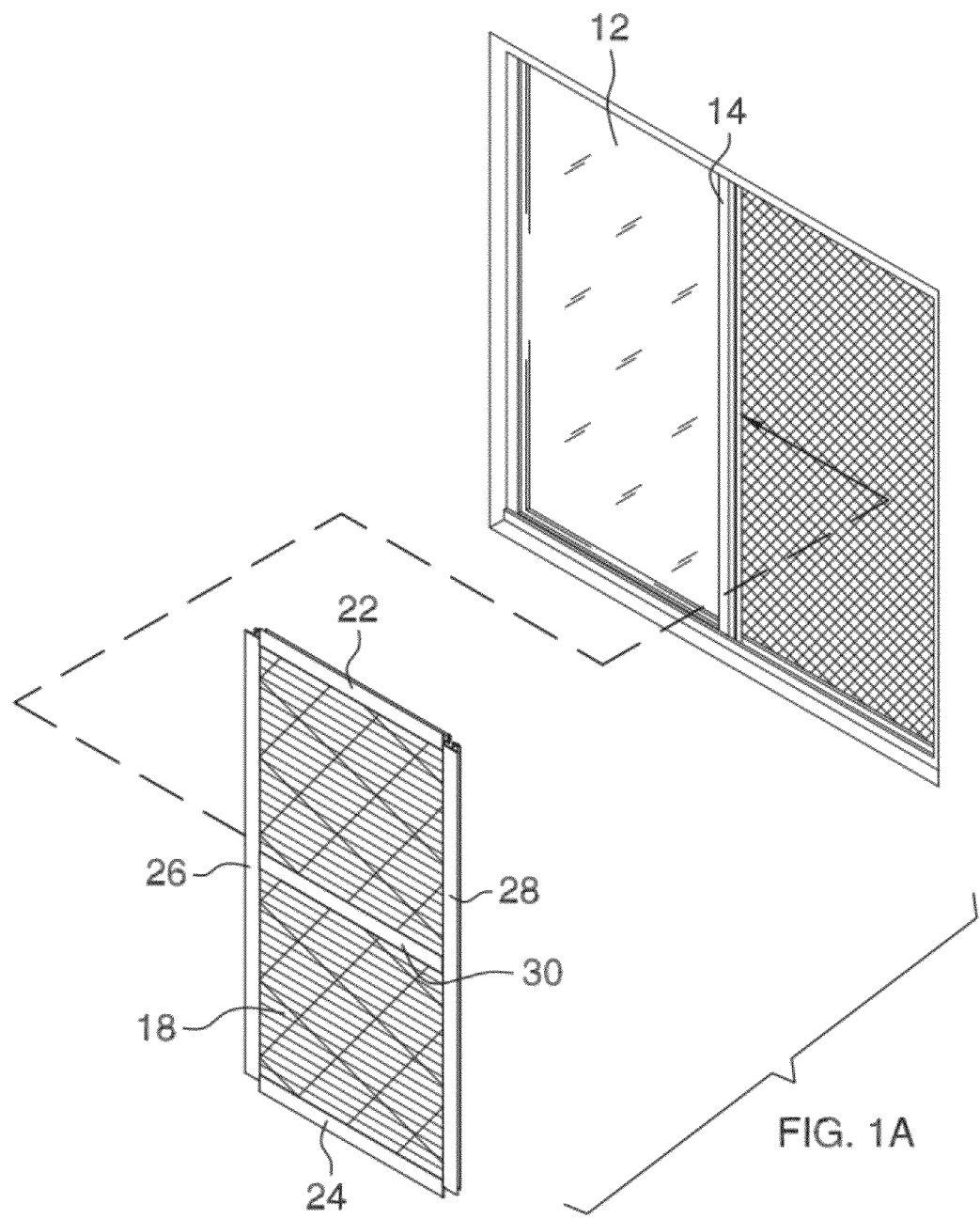

WINDOW FILTER APPARATUS

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

The air that enters our homes is not always as clean and pure as we would like This is especially true in many cities and in areas of manufacturing and the like. While various air conditioning systems can assist in removing air contaminants, few can do so as effectively as is needed. And, not all can afford an air conditioner, and some who can do not want to air condition their abodes when the outside temperature is pleasant. The present apparatus solves the problem of impure air entering our open windows while at the same time providing greater visual privacy when windows are open.

FIELD OF THE INVENTION

The window filter apparatus relates to window treatments and more especially to a window filter apparatus that filters incoming air from open windows.

SUMMARY OF THE INVENTION

The general purpose of the window filter apparatus, described subsequently in greater detail, is to provide a window filter apparatus which has many novel features that result in an improved window filter apparatus which is not anticipated, rendered obvious, suggested, or even implied by prior art, either alone or in combination thereof.

To attain this, the window filter apparatus is provided in embodiments to fit 2-pane windows and 4-pane windows. The apparatus is provided in more than one material makeup. For example, aluminum is used in one embodiment. Elastomeric materials are used in other embodiments. Plasticized materials are used in another embodiment. Each embodiment uses an automatically tensioned frame that removably holds the apparatus within the windows. Filters are removably held within the framework of the apparatus. Box fans can be set within window frames to draw in outside air that is then filtered before entering a building.

The apparatus provides fresh filtered air without the expense of operating an air conditioner, especially when outside air conditions are enjoyable, but air not as clean as desired. The apparatus provides noise abatement also, as the fine mesh filters used filter some external noises. Further, the apparatus provides light filtration, through the filters removably fitted therein, so that softer ambient light is able to enter a building.

Thus has been broadly outlined the more important features of the improved window filter apparatus so that the detailed description thereof that follows may be better understood and in order that the present contribution to the art may be better appreciated.

An object of the window filter apparatus is to filter air entering a building's windows.

Another object of the window filter apparatus is to use existing filters held by the apparatus.

A further object of the window filter apparatus is to provide a visual obstruction with open windows.

An added object of the window filter apparatus is to soften light entering a window.

And, an object of the window filter apparatus is to easily install with no tools or expertise needed.

These together with additional objects, features and advantages of the improved window filter apparatus will be readily apparent to those of ordinary skill in the art upon reading the following detailed description of presently preferred, but nonetheless illustrative, embodiments of the improved window filter apparatus when taken in conjunction with the accompanying drawings.

In this respect, before explaining the current embodiments of the improved window filter apparatus in detail, it is to be understood that the window filter apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved window filter apparatus. It is therefore important that the claims be regarded as including such equivalent constructions insofar as they do not depart from the spirit and scope of the window filter apparatus. It is also to be understood that the phraseology and terminology employed herein are for purposes of description and should not be regarded as limiting.

BRIEF DESCRIPTION OF THE DRAWINGS

FIG. 1A is a perspective view of the apparatus in preparation of insertion into a window frame.

DETAILED DESCRIPTION OF THE DRAWINGS

With reference now to the drawings, and in particular FIGS. 1 through 5 thereof, the principles and concepts of the window filter apparatus generally designated by the reference number 10 will be described.

Figure 1:
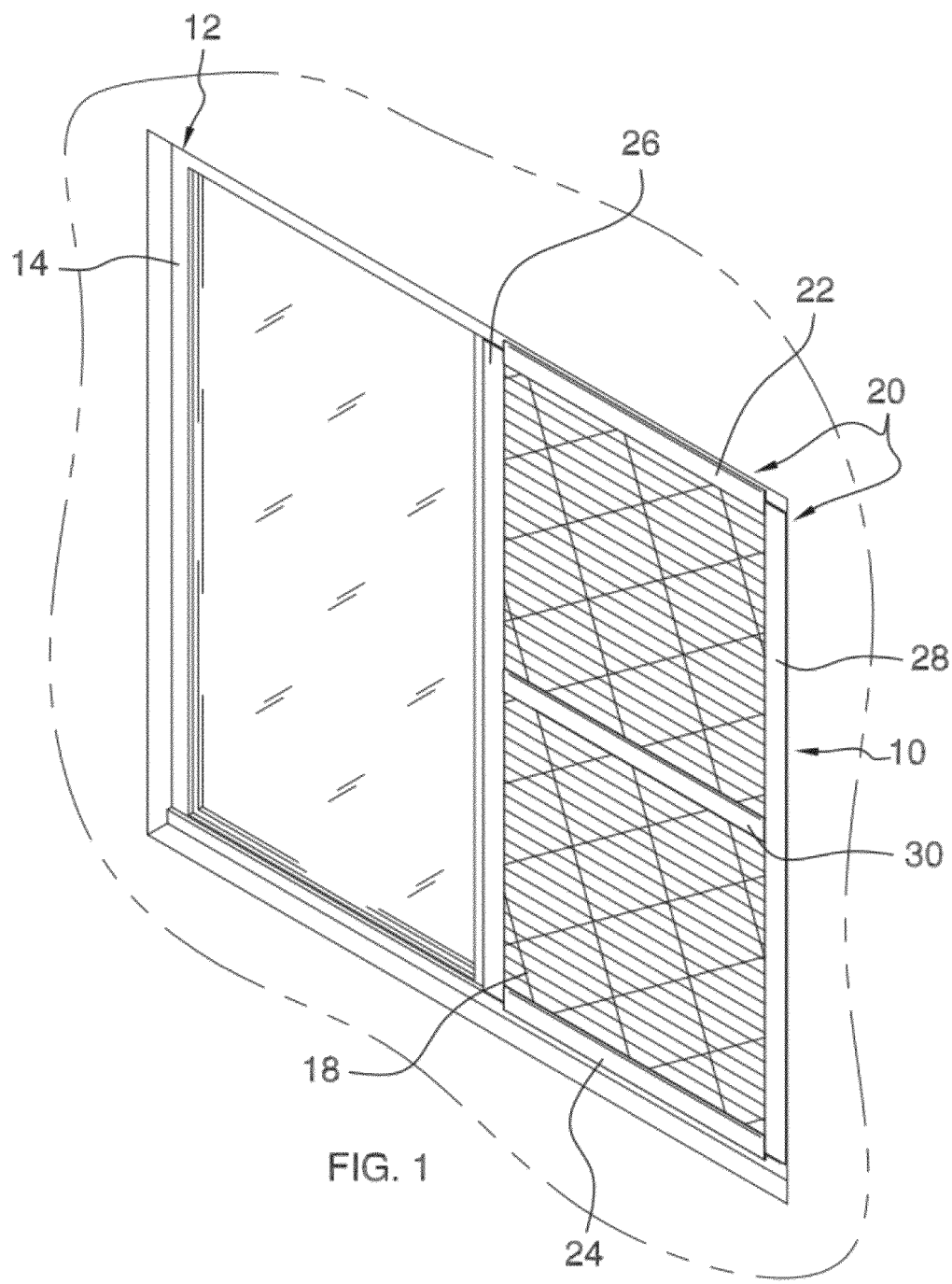
FIG. 1 is a perspective view of the apparatus in use in a window.
Figure 2:
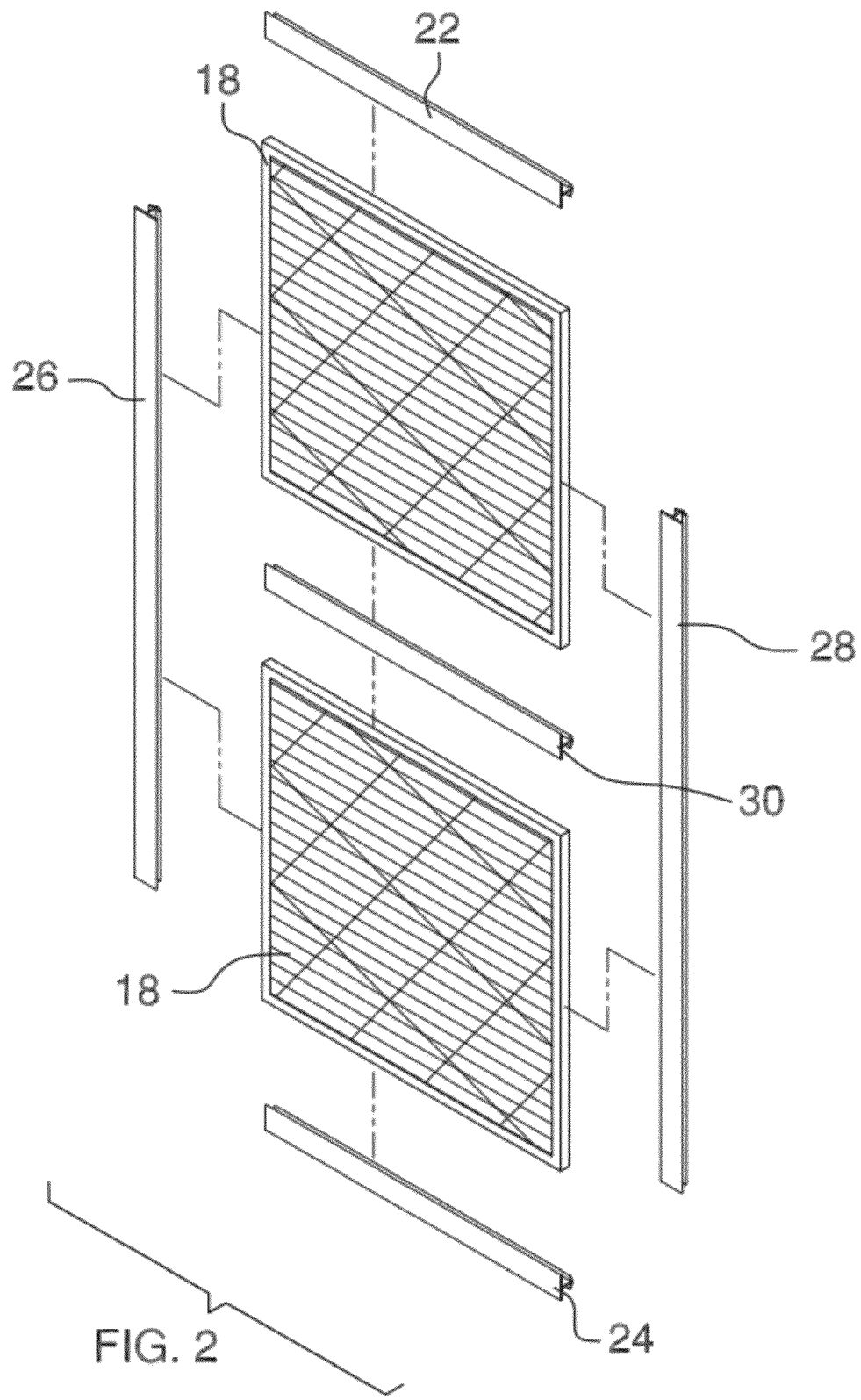
FIG. 2 is an exploded view of the framework and existing filters.

Referring to FIGS. 1 and 2, the apparatus 10 framework 20 has top 22 spaced apart from a bottom 24 and a first side 26 spaced apart from a second side 28. The center horizontal member 30 connects the first side 26 to the second side 28. The framework 20 is provided in both seamless configuration and in separate piece embodiments comprised of the top 22, the bottom 24, the first side 26, the second side 28, and the center horizontal member 30.

Figure 3:
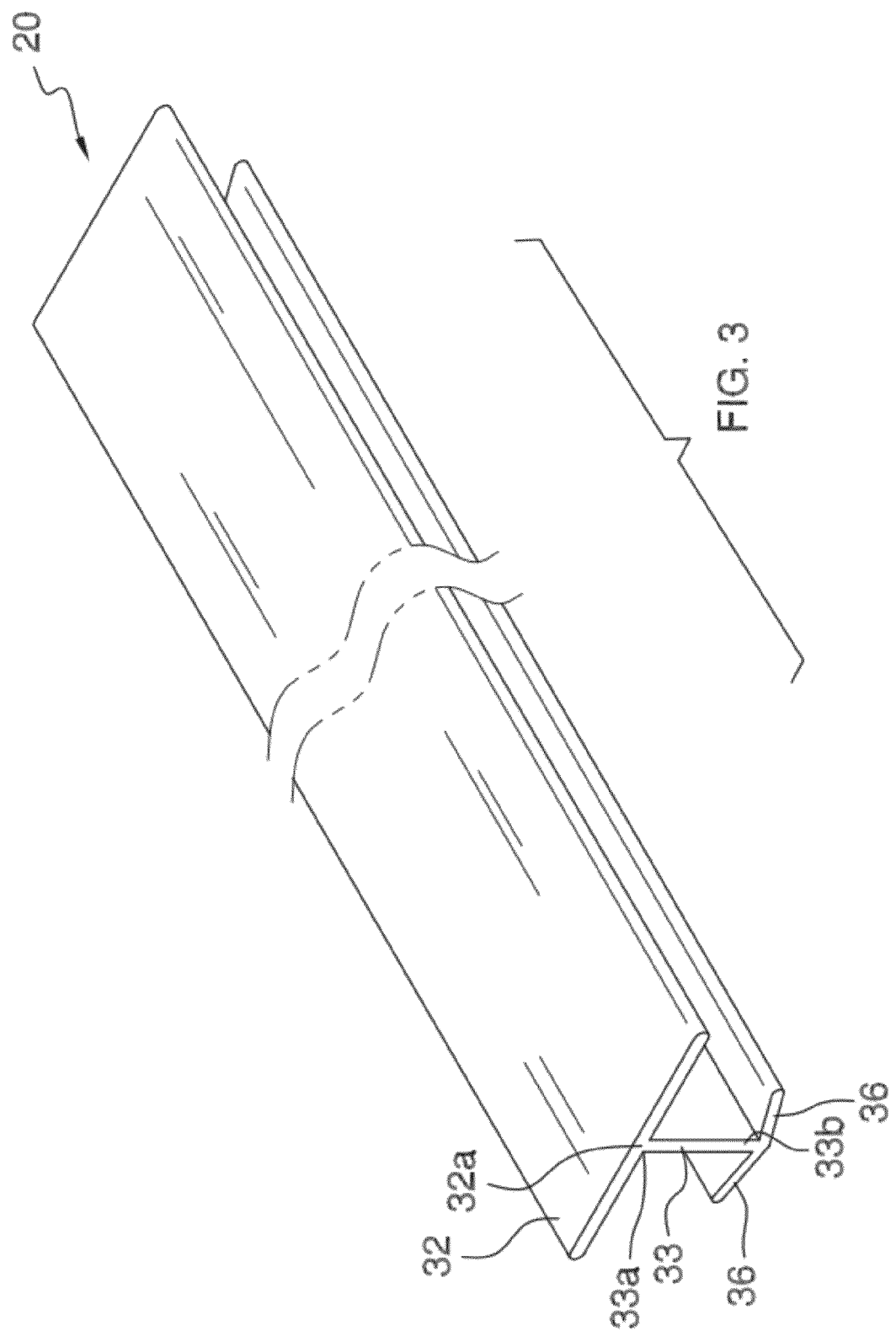
FIG. 3 is a perspective view of a member of the framework.
Figure 5:
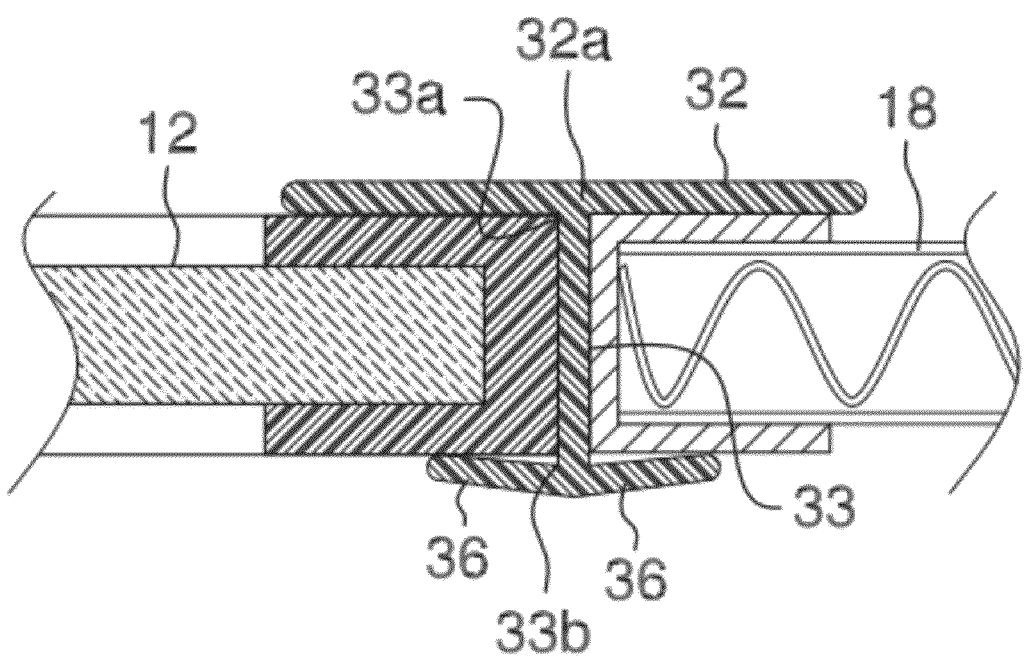
FIG. 5 is a partial cross sectional view of FIG. 4, taken along the line 5-5.

Referring to FIGS. 3 and 5, each of the top 22, bottom 24, first side 26, second side 28, and center horizontal member 30 further comprises a planar outer member 32 having a center 32a. The connecting arm 33 has a first end 33a spaced apart from a second end 33b. The first end 33a is perpendicularly affixed to the planar outer member 32 center 32a. On the top 22, bottom 24, first side, 26 and second side 28, the identical and opposed inward arms 36 are connected to the connecting arm 33 second end 33b. The inward arms 36 are angled slightly toward the planar outer member 32.

Referring to FIGS. 1, 1A, and 5, one inward arm 36 of the framework top 22, bottom 24, first side 26 and second side 28 is removably positioned within the existing window frame 14 of an existing window 12. The planar outer members 32 of the top 22, the bottom 24, the first side 26, and the second side 28 are positioned against the edge of the window frame 14. The tensioned inward arms 36 removably retain the apparatus 10 within the window frame 14. Prior to insertion into the window frame 14, the first existing air filter 18 is positioned between the inward arm 36 and the outer member 32 of the top 22, the first side 26, and the second side 28. The air filter 18 is further positioned within the planar outer member 32 and one of the inward arms 36 of the center horizontal member 30. An additional existing air filter 18 is positioned between the planar outer member 32 of the bottom 24, the first side 26 and the second side 28. The additional air filter 18 is further positioned between the planar outer member 32 and one of the inward arms 36 of the center horizontal member 30.

Figure 4:
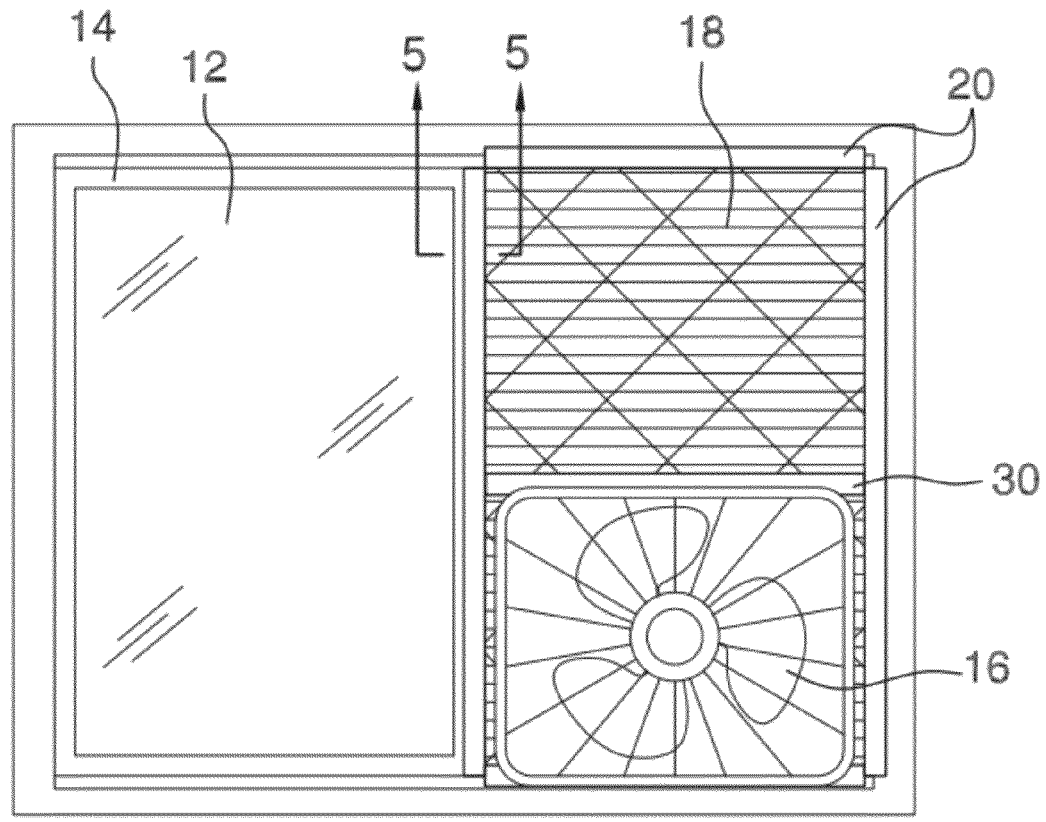
FIG. 4 is a front elevation view of the apparatus in use with a fan.

Referring now to FIG. 4, one inward arm 36 of each of the framework top 22, bottom 24, first side 26 and second side 28 is removably positioned within the existing window frame 14. The planar outer member 32 of the, top 22, the bottom 24, the first side 26, and the second side 28 is positioned against the outer edge of the window frame 14. The inward arms 36 removably retain the apparatus 10 within the window frame 14. The center horizontal member 30 connects the first side 26 to the second side 28. The apparatus is ideally complimented by the use of box fans 16. The existing fans 16 are used to draw fresh air through the captured filters 18. The apparatus 10 thereby provides fresh, filtered air to a building interior.

The present apparatus, as claimed, provides the unexpected and unpredictable benefit of soft ambient lighting. The filters used are not impervious to light but rather filter a significant portion of sunlight entering a room and result in a softer glow within rather than bright light intrusion.

With respect to the above description then, it is to be realized that the optimum dimensional relationships for the parts of the window filter apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the window filter apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the window filter apparatus may be used.

Therefore, the foregoing is considered as illustrative only of the principles of the window filter apparatus. Further, since numerous modifications and changes will readily occur to those skilled in the art, it is not desired to limit the window filter apparatus to the exact construction and operation shown and described, and accordingly, all suitable modifications and equivalents may be resorted to, falling within the scope of the window filter apparatus.

The invention claimed is:

1. A window filter apparatus, comprising:
a framework having top spaced apart from a bottom, a first side spaced apart from a second side, a center horizontal member connecting the first side to the second side, each of the top, bottom, first side, second side, and center horizontal member further comprising:
 a planar outer member having a center;
 a connecting arm having a first end spaced apart from a second end, the first end perpendicularly affixed to the planar outer member center;
 a pair of identical and opposed inward arms connected to the connecting arm second end, each inward arm angled slightly toward the planar outer member;
 wherein one inward arm of each of the top, bottom, first side, and second side is configured to be removably positioned within an existing window frame of an existing window, the planar outer member of the top, bottom, first side, and second side positioned against an outer edge of the window frame, an existing air filter positioned between one inward arm and the outer member of the top, the first side, the second side, the air filter further positioned within the planar outer member and one of the inward arms of the center horizontal member, an additional existing air filter positioned between the planar outer member of the bottom, the first side, the second side, the additional air filter further positioned between the planar outer member and one of the inward arms of the center horizontal member.

2. The apparatus according to claim 1 wherein the framework is further one continuous seamless piece.

3. A window filter apparatus, comprising:
a framework having top spaced apart from a bottom, a first side spaced apart from a second side;
a center horizontal member connecting the first side to the second side;
a center vertical member connecting the top to the bottom, the center horizontal member and the center vertical member connected;
the top, bottom, first side, second side, center horizontal member and center vertical member further comprising:
 a planar outer member having a center;
 a connecting arm having a first end spaced apart from a second end, the first end perpendicularly affixed to the planar outer member center;
 a pair of identical and opposed inward arms connected to the connecting arm second end, each inward arm angled slightly toward the planar outer member;
 wherein one inward arm of each of the top, bottom, first side, and second side is configured to be removably positioned within an existing window frame of an existing window, the planar outer member of the top, bottom, first side, and second side positioned against an outer edge of the window frame, a first existing air filter positioned between one inward arm and the outer member of the top and the first side, the first air filter further positioned within the planar outer member, one of the inward arms of the center horizontal member and one of the inward arms of the center vertical member, a second existing air filter positioned between the planar outer members of the bottom and the first side, the second existing air filter further positioned between the planar outer members and one of the inward arms of the center horizontal member and of the center vertical member, a third existing air filter positioned between the inward arms and the planar outer members of the top and of the second side, the third air filter further positioned between one of the inward arms of each of the center horizontal member and the center vertical member, a fourth existing air filter positioned between the inward arms of and planar outer members of each of the bottom and the second side, the fourth air filter further positioned between inward arms of the center vertical member and the center horizontal member.

4. The apparatus according to claim 3 wherein the framework is further one continuous seamless piece.

* * * * *